United States Patent
Huang et al.

(10) Patent No.: US 7,486,356 B2
(45) Date of Patent: Feb. 3, 2009

(54) PIXEL STRUCTURE OF A LIQUID CRYSTAL DISPLAY AND FABRICATING METHOD WITH BLACK MATRIX PATTERN COVERING OVER TFT AND DIRECTLY LYING ON PARTS OF PIXEL ELECTRODE PATTERN

(75) Inventors: Mao-Tsun Huang, Taoyuan (TW); Ming-Hung Shih, Taoyuan (TW)

(73) Assignee: Au Optronics Corp., Hsinchu (TW)

( * ) Notice: Subject to any disclaimer, the term of this patent is extended or adjusted under 35 U.S.C. 154(b) by 309 days.

(21) Appl. No.: 11/180,754

(22) Filed: Jul. 11, 2005

(65) Prior Publication Data

US 2006/0033862 A1 Feb. 16, 2006

(30) Foreign Application Priority Data

Aug. 13, 2004 (TW) .............................. 93124315 A

(51) Int. Cl.
*G02F 1/1333* (2006.01)
(52) U.S. Cl. ........................................ 349/110; 349/42
(58) Field of Classification Search ................... 349/42, 349/43, 110, 117, 147, 44, 111
See application file for complete search history.

(56) References Cited

U.S. PATENT DOCUMENTS

| | | | |
|---|---|---|---|
| 5,703,668 A * | 12/1997 | Shin | 349/110 |
| 5,781,254 A * | 7/1998 | Kim et al. | 349/44 |
| 5,789,761 A * | 8/1998 | Ihara et al. | 257/59 |
| 6,338,989 B1 | 1/2002 | Ahn et al. | 438/158 |
| 6,448,117 B1 | 9/2002 | Jen et al. | 438/160 |
| 6,570,631 B2 | 5/2003 | Ko | 349/43 |
| 2001/0048491 A1 | 12/2001 | Tanaka et al. | 349/44 |
| 2003/0197187 A1* | 10/2003 | Kim et al. | 257/83 |
| 2004/0001170 A1* | 1/2004 | Chang et al. | 349/106 |

FOREIGN PATENT DOCUMENTS

| | | |
|---|---|---|
| CN | 1353328 | 6/2002 |
| JP | 10-048650 | 2/1998 |
| JP | 10-062815 | 3/1998 |
| JP | 2001-125134 | 5/2001 |

* cited by examiner

*Primary Examiner*—David Nelms
*Assistant Examiner*—John Heyman
(74) *Attorney, Agent, or Firm*—J.C. Patents

(57) ABSTRACT

A method of fabricating a pixel structure of liquid crystal display is described. A transparent conductive layer and a first metal layer are formed over a substrate sequentially. The first metal layer and the transparent conductive layer are patterned to form a gate pattern and a pixel electrode pattern. A gate insulating layer and a semiconductor layer are formed over the substrate sequentially. A patterning process is performed to preserve the semiconductor layer and the gate insulating layer above the gate pattern and remove the first metal layer of the pixel electrode pattern. A second metal layer is formed over the substrate. The second metal layer is patterned to form a source pattern and a drain pattern. A black material layer is formed over the substrate, and then the black material layer is patterned to form a black matrix pattern uncovering the transparent conductive layer of the pixel electrode pattern.

9 Claims, 8 Drawing Sheets

PIXEL STRUCTURE OF A LIQUID CRYSTAL DISPLAY AND FABRICATING METHOD WITH BLACK MATRIX PATTERN COVERING OVER TFT AND DIRECTLY LYING ON PARTS OF PIXEL ELECTRODE PATTERN

CROSS-REFERENCE TO RELATED APPLICATION

This application claims the priority benefit of Taiwan application serial no. 93124315, filed on Aug. 13, 2004. All disclosure of the Taiwan application is incorporated herein by reference.

BACKGROUND OF THE INVENTION

1. Field of Invention

The present invention relates to a pixel structure of a liquid crystal display (LCD) and the method for fabricating the pixel, and a LCD panel. More particularly, the present invention relates to a pixel structure of a liquid crystal display (LCD) and the method for fabricating the pixel, and a LCD panel, using four photomasks to form the black matrix on the thin film transistor (TFT) array.

2. Description of Related Art

The TFT LCD panel mainly includes a TFT-array substrate with a TFT array, a color-filter substrate with a color filter array, and a liquid crystal layer between the two substrates, wherein the TFT-array substrate is formed by several pixels, and each pixel includes one TFT and one pixel electrode.

The conventional method to form the pixel structure of the TFT LCD needs five photomasks. The first photomask is used to define a first metal layer, so as to form a scan line and a gate electrode of the TFT. The second photomask is used to define a channel layer and an ohm contact layer of the contact layer. The third photomask is used to define a second metal layer, to form a data line and source/drain electrodes of the TFT. The fourth photomask is used to pattern a protection layer. The fifth photomask is used to pattern a transparent conductive layer, so as to form the pixel electrode.

In addition, the color-filter substrate is implemented with a photoresist pattern with three colors of red, green, and blue, but also implemented with a black matrix between the color photoresist patterns. The color photoresist patterns on the color filter substrate are with respect to the pixels on the TFT-array substrate, and the black matrix pattern is with respect to the metal lines on the TFT-array substrate.

However, as the trend for the TFT LCD having been developed toward a greater size in fabrication, it would confront many issues to be solved, such as decrease of yield rate and throughput. In this situation, if the number of the photomasks can be reduced, the number of photolithographic processes on the film layers can be reduced, and thereby the fabrication time can be reduced, the throughput can increase, and then the fabrication cost is reduced.

SUMMARY OF THE INVENTION

With an objective, the invention provides a pixel structure of LCD. The pixel structure can be formed by using four photomasks, and the pixel structure further includes the formation of black matrix pattern.

With another objective, the invention provides method for forming a pixel structure of LCD. The method uses four photomask processes. The four photomask processes can also form the black matrix pattern on a TFT-array substrate.

With further another objective, the invention provides an LCD panel. The TFT-array substrate of the LCD panel includes the implementation of black matrix pattern.

The invention provides a method for forming a pixel structure of LCD. The method includes sequentially forming a transparent conductive layer and a first metal layer on a substrate. A first photomask process is performed, to pattern the first metal layer and the transparent conductive layer, so as to define a gate electrode pattern and a pixel electrode pattern. Then, a gate insulating layer and a semiconductor layer are sequentially formed over the substrate, to cover over the gate electrode pattern and the pixel electrode pattern. A second photomask process is performed to pattern the gate insulating layer and the semiconductor layer, wherein a portion above the gate electrode remains, and the first metal layer on the pixel electrode is also removed. Then, a second metal layer is formed over the substrate, and a third photomask process is performed to pattern the second metal layer, wherein a remaining portion of the second metal layer on the semiconductor layer forms a source electrode pattern and a drain electrode pattern. Then, a black matrix material layer is formed over the substrate, and a fourth photomask process is performed to pattern the black matrix material layer, so as to form a black matrix pattern and expose the transparent electrode layer of the pixel electrode pattern.

The invention further provides a pixel structure of LCD. The pixel structure includes a TFT, a pixel electrode pattern, and a black matrix pattern. Wherein, the TFT is disposed on a surface of a substrate, and the TFT includes a gate electrode pattern, a gate insulating layer disposed on the gate electrode pattern, a semiconductor layer over the gate insulation layer, and a source electrode pattern as well as a drain electrode pattern formed over the semiconductor layer. The pixel electrode pattern is disposed on the surface of the substrate, and the pixel electrode pattern electrically contacts with the drain electrode pattern of the TFT. In addition, the black matrix pattern covers the TFT and exposes the foregoing pixel electrode pattern.

The invention further provides an LCD panel, including a TFT-array substrate, a color-filter substrate, and a liquid crystal layer. Wherein the TFT-array substrate has several pixels, and each of the pixels includes a TFT, a pixel electrode pattern, and a black matrix pattern. Wherein, the TFT includes a gate electrode pattern, a gate insulating layer disposed on the gate electrode pattern, a semiconductor layer covering over the gate insulating layer, and a source/drain electrode pattern formed on the semiconductor layer. The pixel electrode pattern is disposed on the surface of the substrate, and the pixel electrode pattern electrically contacts with the drain electrode pattern of the TFT. Further, the black matrix pattern covers the TFT and exposes the pixel electrode pattern.

The invention can just use four photomask processes to accomplish the formation of pixel structure. Also and, in the four photomask processes, it also includes defining the black matrix pattern on the TFT-array substrate. The method of the invention can reduce the number of photomasks being used in the conventional fabrication processes, so that it has the advantages that the throughput can increase and fabrication can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Four Photomask Processes

First Embodiment

Figure 1:
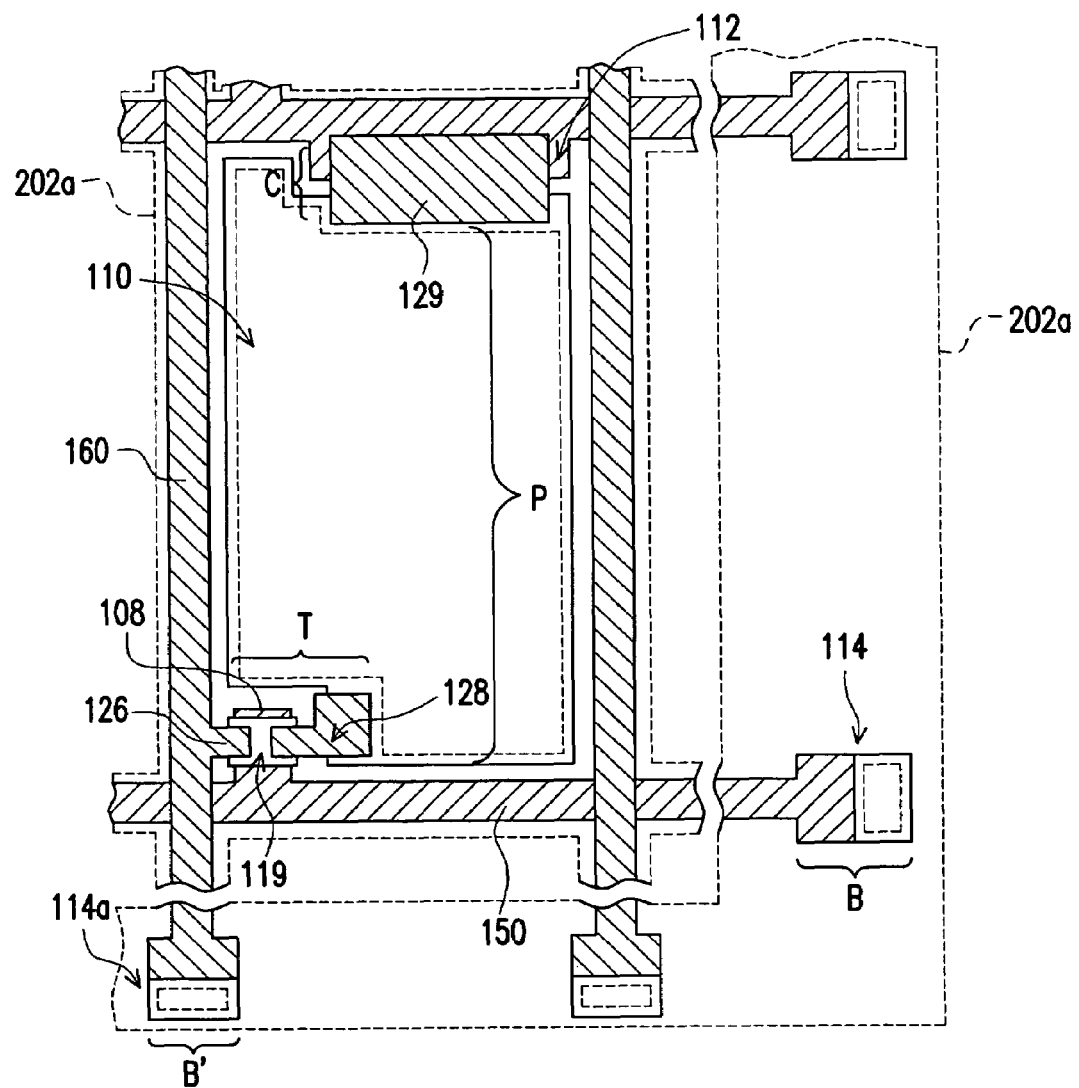
FIG. 1 is a top view, schematically illustrating a pixel structure of the LCD, according to a preferred embodiment of the invention.

FIG. 1 is a top view, schematically illustrating a pixel structure of the LCD, according to a preferred embodiment of the invention. FIGS. 2A-2H are cross-sectional views, schematically illustrating the fabrication procedure for one of the pixel structures of the LCD, according to a first preferred embodiment of the invention.

Figure 2A:
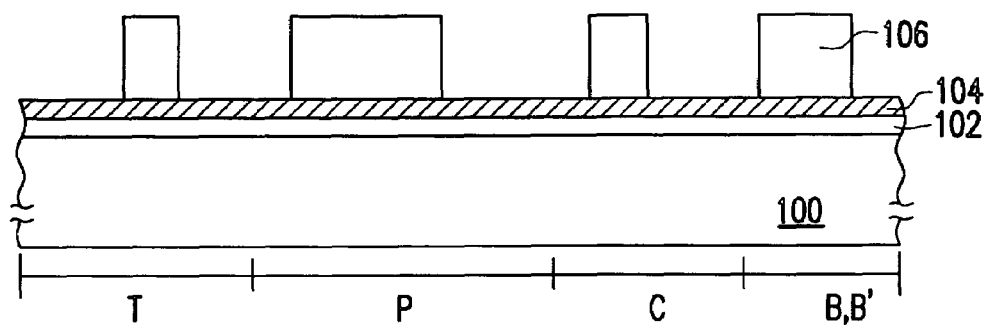
FIGS. 2A-2H are cross-sectional views, schematically illustrating the fabrication procedure for the pixel structure of the LCD, according to a first preferred embodiment of the invention.

In FIG. 1 and FIG. 2A, a transparent conductive layer 102 and a first metal layer 104 are sequentially formed over a substrate 100. In the preferred embodiment, the substrate 100 can include, for example, a preset region for forming a TFT T, a preset region for forming a pixel electrode P, a preset region for forming a storage capacitor C, and a preset region for forming multiple bonding pads B and B'. The substrate 100 can be, for example, a glass substrate or a transparent plastic substrate. The transparent conductive layer 102 can be, for example, metal oxide, such as indium-tin oxide (ITO), indium-zinc oxide (IZO), or other like material. The first metal layer 104 can be, for example, Cr, W, Ta, Ti, Mo, Al, or alloy thereof. Particularly, if the transparent electrode layer 102 uses the ITO or IZO, then the first metal layer 104 preferably is Cr, W, Ta, Ti, Mo, or alloy thereof.

Figure 2B:
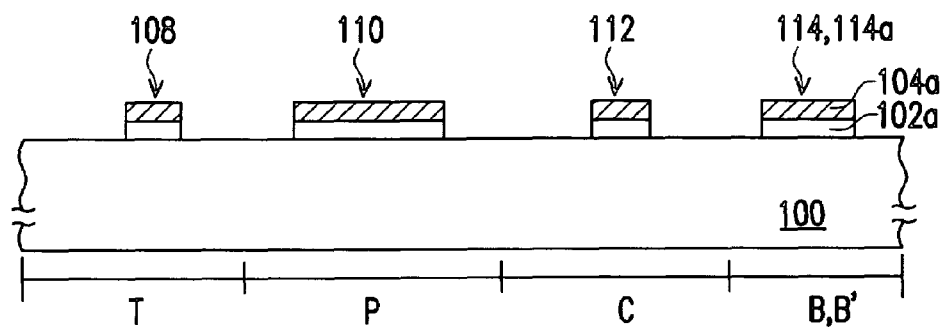

Then, a first photomask process is performed to form a patterned photoresist layer 106 on the first metal layer 104. The patterned photoresist layer 106 is used as the etching mask to perform an etching process, so as to pattern the first metal layer 104 and the transparent conductive layer 102, and then form the patterned first metal layer 104a and the patterned transparent conductive layer 102a, as shown in FIG. 2B. In the preferred embodiment, the first photomask process is to define a gate electrode pattern 108 at the preset region for forming a TFT T, and a pixel electrode pattern 110 at the preset region for forming a pixel electrode P, and define a scan line 150, as shown in FIG. 1, for electrically coupling with the gate electrode pattern 108.

In another embodiment, it can further include defining the lower electrode pattern 112 within the preset region for forming the storage capacitor C. The storage capacitor C includes, for example, a storage capacitor on gate (Cs on gate). In another embodiment, the first photomask process can further include defining a bonding pad pattern 114, which is electrically coupled to the scan line 150, within the preset region for forming the bonding pad B at an edge of the substrate 100. It further includes defining a separate bonding pad pattern 114a, which is shown in cross-sectional view and is the same as or about similar to the bonding pad B', within the preset region for forming the bonding pad B at another edge of the substrate 100. In another embodiment, the first photomask process further includes defining the lower electrode pattern 112 and the bonding pad pattern 114.

Figure 2C:
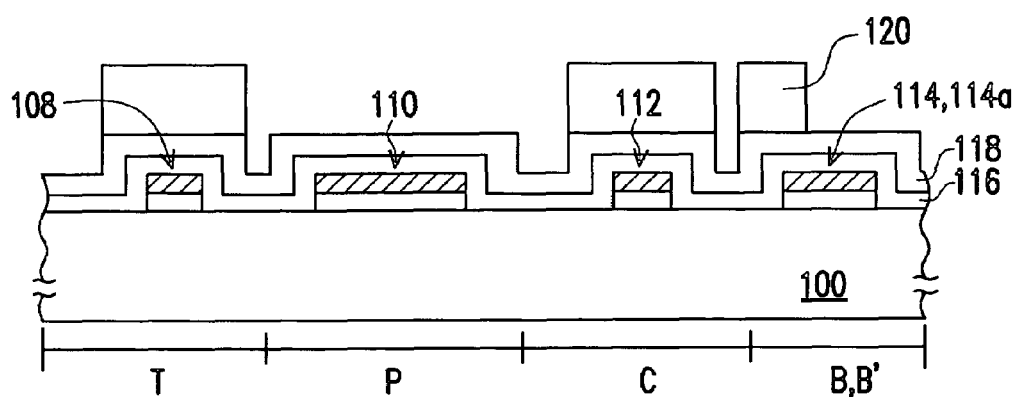

Referring to FIG. 1 and FIG. 2C, a gate insulating layer 116 and a semiconductor layer 118 are sequentially formed over the substrate 100, to cover the previously formed structure. In a preferred embodiment, the gate insulating layer 116 can be, for example, silicon nitride, silicon oxide, or silicon oxynitride. The semiconductor layer 118 includes, for example, a channel layer such as amorphous silicon and an ohm contact layer such as doped amorphous silicon.

Figure 2D:
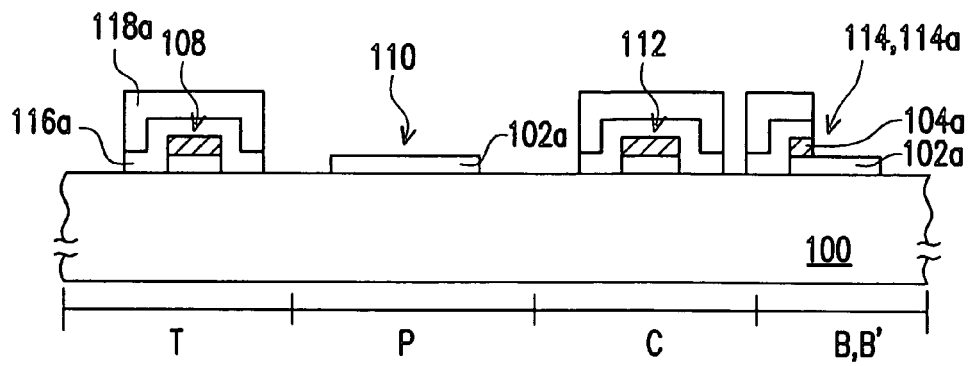

Then, a second photomask process is performed to form a patterned photoresist layer 120 on the semiconductor layer 118, and the photoresist layer 120 is used as an etching mask to perform an etching process. As shown in FIG. 2D, the semiconductor layer 118 and the gate insulating layer 116 are patterned to form a patterned semiconductor layer 118a and a patterned gate insulating layer 116a. The first metal layer 114a on the pixel electrode pattern 110 is also removed, wherein only the transparent conductive layer 102a of the pixel electrode 110 remains. In another embodiment, for the second photomask process, the semiconductor layer 118a and the gate insulating layer 116a above the gate electrode pattern 108 remain.

In another embodiment, the second photomask process can further allow the semiconductor layer 118a and the gate insulating layer 116a above the electrode pattern 112 to remain, for use as the capacitor dielectric. In further another embodiment, the second photomask process further includes removing a portion of the semiconductor layer 118a and gate insulating layer 116a over the bonding pad pattern 114, and a portion of the first metal layer 104a of the bonding pad pattern 114. As a result, the transparent conductive layer 102a of the bonding pad pattern 114 is exposed. In another embodiment, the second photomask process further includes that the semiconductor layer 118a and the gate insulating layer 116a over the lower electrode pattern 112 and the bonding pad pattern 114 remain, and a portion of the first metal layer 104a of the bonding pad pattern 114 is removed to expose the transparent conductive layer 102a of the bonding pad pattern 114.

Figure 2E:
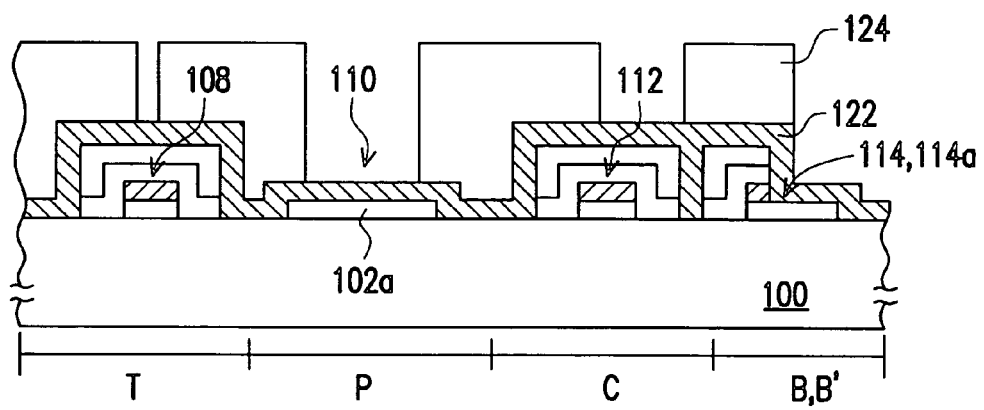

Referring to FIG. 1 and FIG. 2E, a second metal layer 122 is deposited over the substrate 100, to cover the previously formed structure. In a preferred embodiment, the second metal layer 122 includes, for example, Cr, W, Ta, Ti, Mo, Al, or alloy thereof.

Figure 2F:
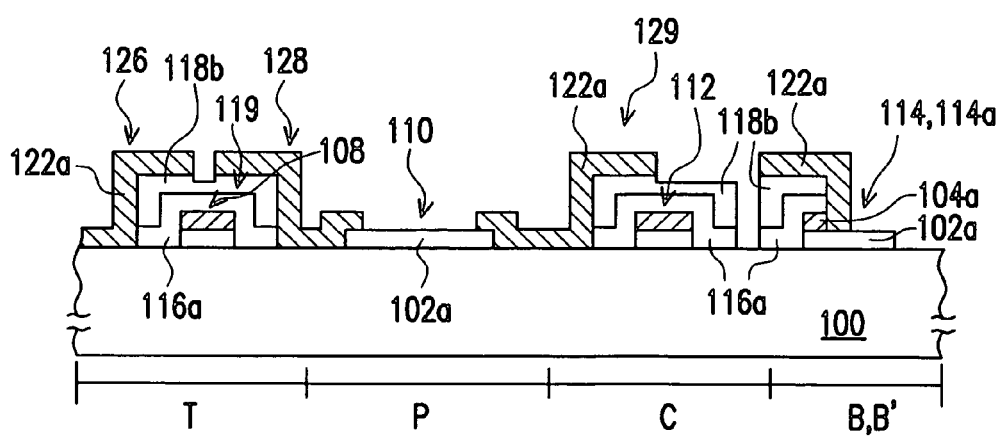

Then, a third photomask process is performed to form a patterned photoresist layer 124 on the second metal layer 122, and the photoresist layer 124 is used as the etching mask to perform an etching process. The second metal layer 122 is patterned to form a patterned second metal layer 122a, as shown in FIG. 2F. In an embodiment, the second metal layer 122a over the gate electrode pattern 108 is a source electrode pattern 126 and a drain electrode pattern 128, and the drain electrode pattern 128 is electrically connected to the pixel electrode pattern 110. Moreover, in the third photomask process, it further defines the source electrode pattern 126 to be coupled to a data line 160, as shown in FIG. 1. In another embodiment, while patterning the second metal layer 122, it further includes simultaneously reducing a portion of thickness of the semiconductor layer 118a between the source electrode pattern 126 and the drain electrode pattern 128, wherein a portion of the ohm contact layer is for example removed, and the semiconductor layer 118b is formed, so as to form a channel layer 119 between the source electrode pattern 126/drain electrode pattern 128 and the gate insulating layer 108.

In another embodiment, the third photomask process further includes that the second metal layer 122a above the corresponding lower electrode pattern 112 remains to serve as an upper electrode 129 of the pixel storage capacitor. The upper electrode 129 is electrically coupled with the pixel electrode pattern 110, so that the upper electrode 129, the lower electrode pattern 112 and the dielectric material between the two electrodes, such as the gate insulating layer 116a and the semiconductor layer 118a, form a pixel storage capacitor. In another embodiment, the third photomask process further includes that the second metal layer 122a over the corresponding bonding pad pattern 114 remains, and the second metal layer 122a is electrically contacted with the first metal layer 104a and the transparent conductive layer 102a. Also and, a second metal layer 122a is formed within the preset region for forming the bonding pad B' at the edge of the substrate 100, with electric connection to data line 160, so as to serve as a portion of the bonding pad 114a. Preferably, the structure of the bonding pad B' is the same as or about the same as the structure of the bonding pad B. Further in another embodiment, the third photomask process is further included, wherein the second metal layer 122a above the corresponding lower electrode pattern 112 and the bonding pad pattern 114, 114a remain.

Figure 2G:
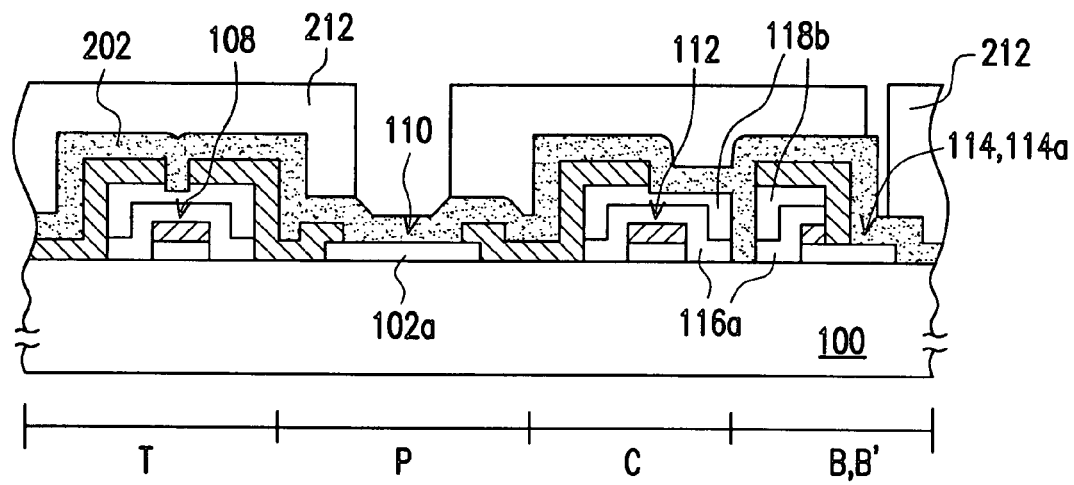

Referring to FIG. 1 and FIG. 2G, a black material layer 202 is deposited over the substrate 100, to cover the previously formed structure. In an embodiment, the black material layer 202 can be, for example, black organic material or black inorganic insulating material. The black organic material is, for example, black resin. It should be noted that the invention is not necessary to limit the material for the black material layer 202. Any material capable of shielding the light and can be used to form the black matrix is suitable for use. Preferably, it can also serve as the protection material layer.

Figure 2H:
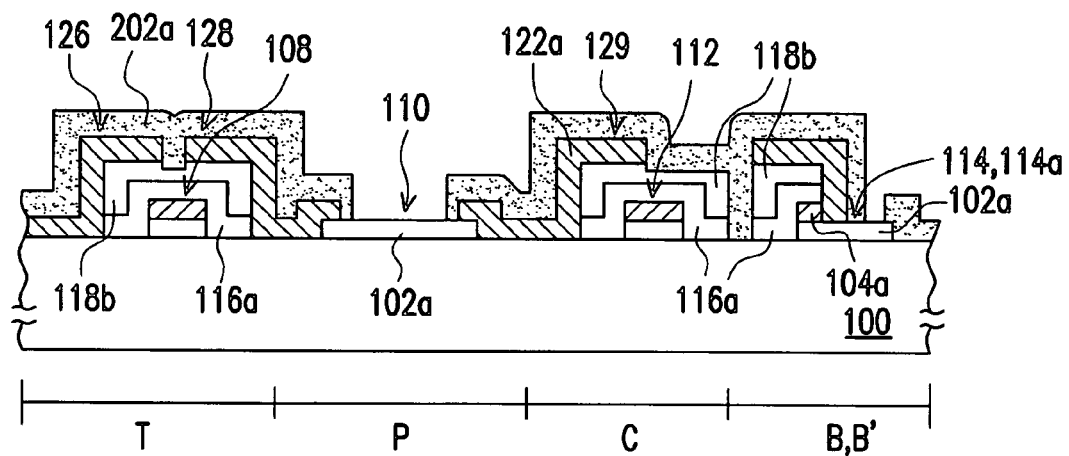

After then, a fourth photomask process is performed to form a patterned photoresist layer 212 on the black material layer 202, and an etching process is performed by using the photoresist layer 212 as the etching mask. The black material layer 202 is patterned into black matrix pattern 202a, as shown in FIG. 2H. In another embodiment, the black matrix pattern 202a exposes the transparent conductive layer 102a of the pixel electrode pattern 110. In another embodiment, the black matrix pattern 202a further exposes the transparent conductive layer 102a of the bonding pad patterns 114, 114a, so as allow to be electrically coupled to the external circuit.

It should be noted that if the foregoing black material layer 202 is a photosensitive material, then it is not necessary to form the patterned photoresist layer 212 on the black material layer 202, and the light exposure and image development procedures can be directly performed on the black material layer 202 to pattern and form the black matrix pattern 202a. The black matrix pattern 202a exposes the transparent conductive layer 102a of the pixel electrode pattern 110 and the transparent conductive layer 102a of the bonding pad patterns 114, 114a, so as allow to be electrically coupled to the external circuit.

Second Embodiment

Figure 3A:
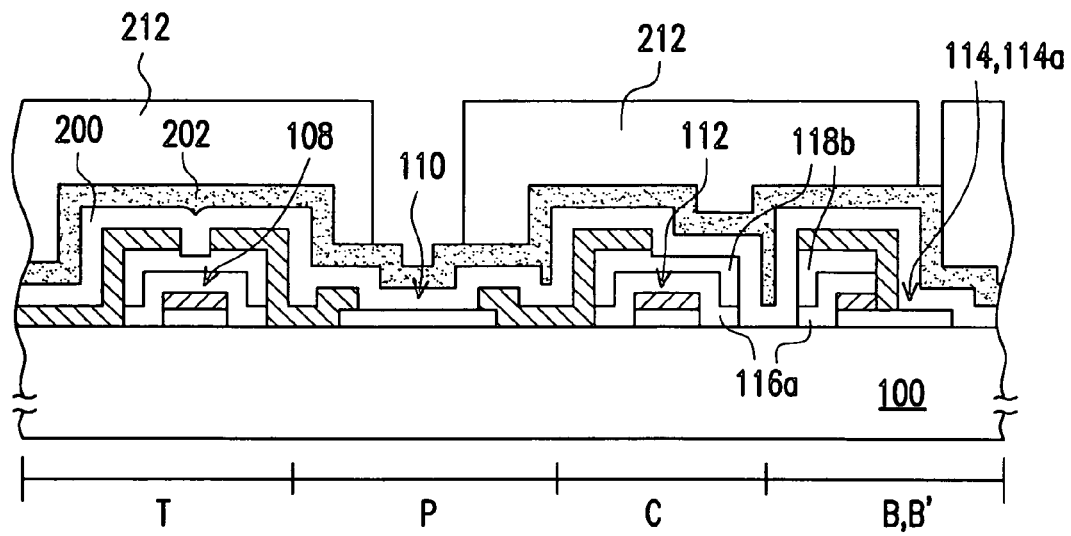
FIGS. 3A-3B are cross-sectional views, schematically illustrating the fabrication procedure for the pixel structure of the LCD, according to a second preferred embodiment of the invention.
Figure 4A:
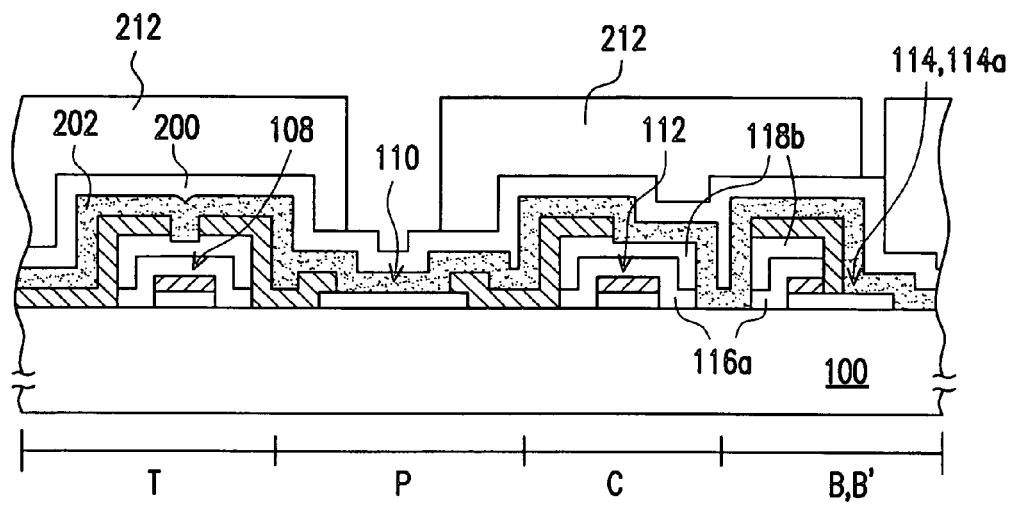
FIGS. 4A-4B are cross-sectional views, schematically illustrating the fabrication procedure for the pixel structure of the LCD, according to the second preferred embodiment of the invention.
Figure 4B:
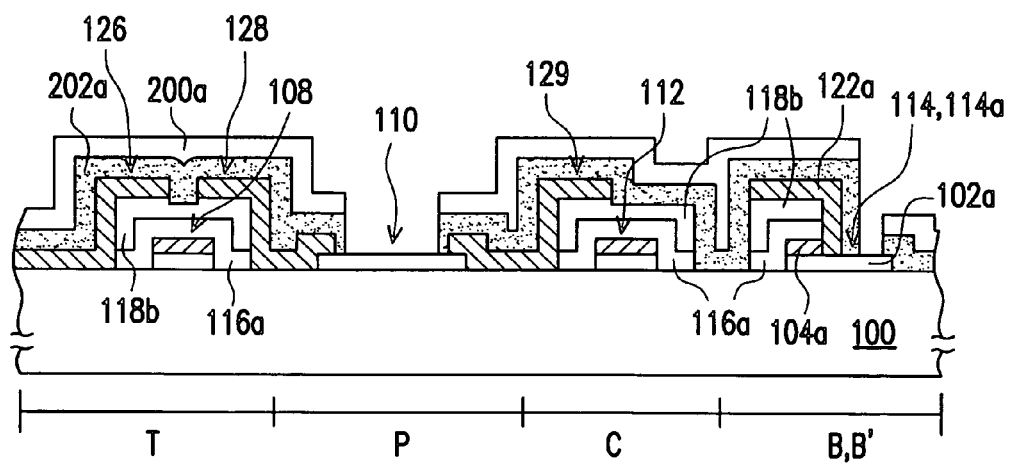

FIGS. 4A-4B are cross-sectional views, schematically illustrating the fabrication procedure for the pixel structure of the LCD, according to the second preferred embodiment of the invention. In FIG. 3A, FIG. 3A is subsequent to the fabrication processes in FIGS. 2A-2F. That is, after the third photomask process to form the second metal layer, a protection layer 200 is formed over the substrate 100, and a black material layer 202 is form on the protection layer 200. In an embodiment, the protection layer 200 includes, for example, silicon oxide, silicon nitride, silicon oxynitride, or organic material. The black material layer 202 can be the black organic material or black inorganic material as previously mentioned, but also can be the metallic material with the capability of shielding light.

Figure 3B:
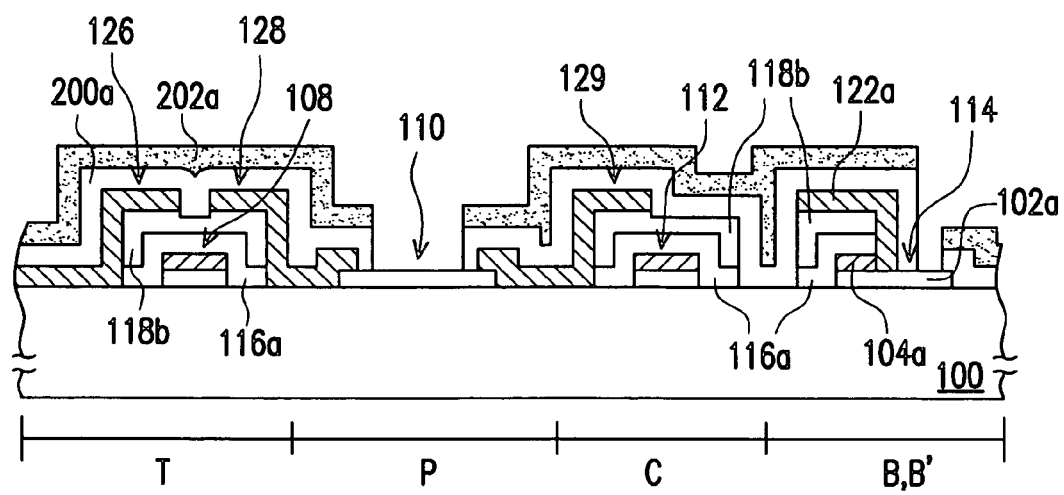

After then, a fourth photomask process is performed to form a patterned photoresist layer 212 on the black material layer 202, and an etching process is performed by using the photoresist layer 212 as an etching mask, so as to pattern the black material layer 202 and the protection layer 200, and thereby form the black matrix pattern 202a and the protection layer 200a with similar pattern to the black matrix pattern 202a, as shown in FIG. 3B. In an embodiment, the black matrix pattern 202a and the protection layer 200a expose the transparent conductive layer 102a of the pixel electrode pattern 110. In another embodiment, the black matrix pattern 202a and the protection layer 200a further expose the transparent conductive layer 102a of the bonding pads 114, 114a, so as to allow the electric connection to the external circuit.

Likewise, if the black material layer 202 of FIG. 3A uses the photosensitive material, then it is not necessary to form the patterned photoresist layer 212 on the black material layer 202, and the light exposure and image development procedures can be directly performed on the black material layer 202 to pattern and form the black matrix pattern 202a. Then, the black matrix pattern 202a is directly used as the etching mask to perform the etching process and pattern the protection layer 200, which is a patterned protection layer 200a, as shown in FIG. 3B. The transparent conductive layer 102a of the pixel electrode pattern 110 is exposed, and the transparent conductive layer 102a of the bonding pads 114, 114a is also exposed and allows an electrical connection to the external circuit.

In the second embodiment of the invention, after the black material layer 202 is formed, then the protection layer 200 id formed on the black material layer 202, as shown in FIG. 4A. At this moment, since the black material layer 202 would cover over the surface of the second metal layer 122a, the material of the black material layer 202 preferably uses the black organic material or the black inorganic insulating material.

Then, the fourth photomask process is likewise performed, to form a patterned photoresist layer 212 on the protection layer 200, and an etching process with the photoresist layer 212 as an etching mask is performed, so as to pattern the protection layer 200 and the black material layer 202 to form the patterned protection layer 200a and the patterned black matrix pattern 202a. Wherein, the patterned protection layer 200a has the similar pattern to the black matrix pattern 202a, as shown in FIG. 4B. In an embodiment, the patterned protection layer 200a and the black matrix pattern 202a expose the transparent conductive layer 102a of the pixel electrode pattern 110. In another embodiment, the patterned protection layer 200a and the black matrix pattern 202a further expose the transparent conductive layer 102*a* of the bonding pads 114, 114*a* and allow an electrical connection to the external circuit.

Third Embodiment

Figure 5A:
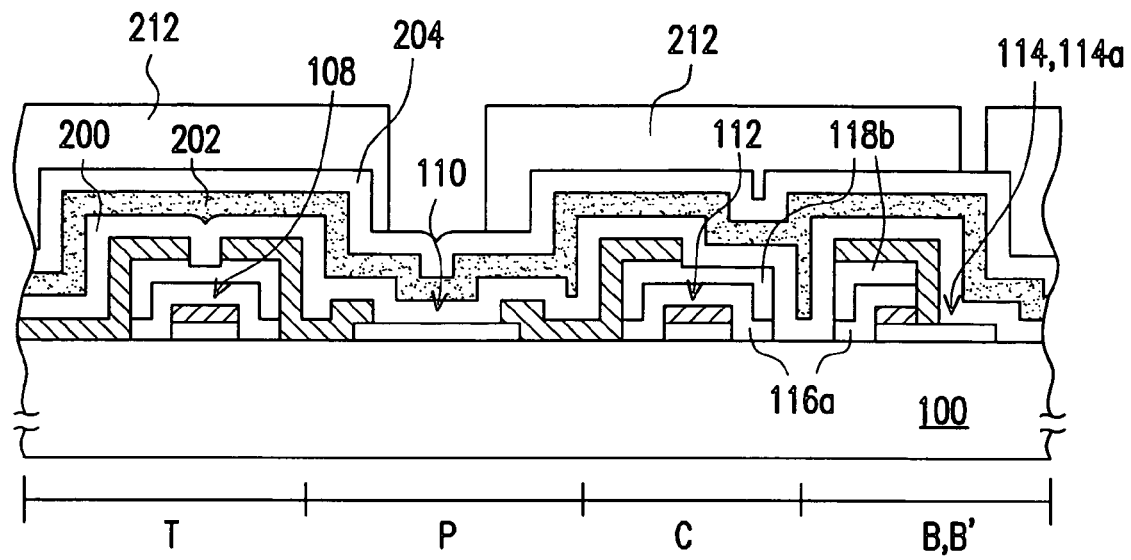
FIGS. 5A-5B are cross-sectional views, schematically illustrating the fabrication procedure for the pixel structure of the LCD, according to the third preferred embodiment of the invention.
Figure 5B:
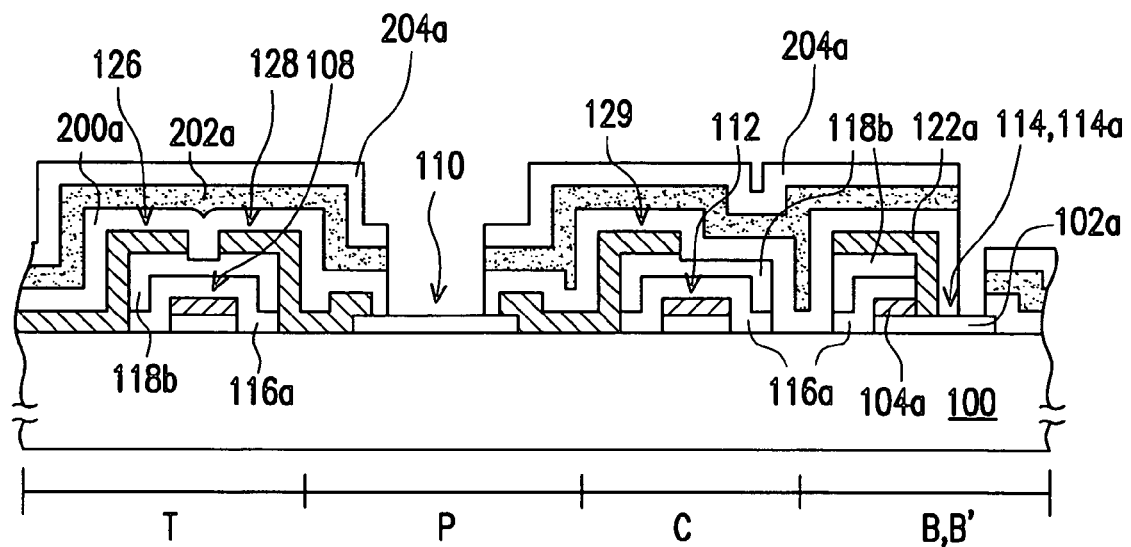

FIGS. 5A-5B are cross-sectional views, schematically illustrating the fabrication procedure for the pixel structure of the LCD, according to the third preferred embodiment of the invention. In FIG. 5A, it is the subsequent process from the previous processes in FIGS. 2A-2F. That is, after the third photomask process to form the second metal layer, a protection layer 200, a black material layer 202 and another protection layer 204 are sequentially formed over the substrate 100. In an embodiment, the protection layer 200 and the protection layer 204 include, for example, silicon oxide, silicon nitride, silicon oxynitride, or organic material. The black material layer 202 can be, for example, black organic material, black inorganic insulating material, or metallic material with capability to shield the light.

Then, a fourth photomask process is performed to form a patterned photoresist layer 212 on the protection layer 204, and an etching process is performed by using the photoresist layer 212 as the etching mask, to pattern the protection layer 204, the black material layer 202 and the protection layer 200. The patterned protection layer 204*a*, the black matrix pattern 202*a*, and the patterned protection layer 200*a* are formed, as shown in FIG. 5B. Wherein, the patterned protection layers 204*a* and 200*a* have the similar pattern to the black matrix pattern 202*a*. In an embodiment, the patterned protection layer 204*a*, the black matrix pattern 202*a*, and the protection layer 200*a* expose the transparent conductive layer 102*a* of the pixel electrode pattern 110. In another embodiment, further the patterned protection layer 204*a*, the black matrix pattern 202*a*, and the protection layer 200*a* expose the transparent conductive layer 102*a* of the bonding pads 114, 114*a* and allow an electrical connection to the external circuit.

Fourth Embodiment

The pixel structure of the TFT LCD and the fabrication method of the fourth embodiment is a change from the foregoing three embodiments. The change is the step shown in FIG. 2A. After the transparent conductive layer 102 is formed over the substrate 100, the metal layer 104 formed on the transparent conductive layer 102 is a multi-layer metallic structure, for example, formed by two or three layers. The multi-layer metallic structure, for example, includes a selection from Cr, W, Ta, Ti, Mo, Al, or alloy thereof. In the embodiment, the first metal layer 104 is, for example, a three-layer structure of Al/Cr/Al, a three-layer structure of Mo/Al/Mo, or two-layer structure of Cr/Al. Particularly, if the transparent conductive layer 102 uses the ITO or IZO, then the film layer contacting with the transparent conductive layer 102 in the multi-layer metal layer 104 preferably uses Cr, W, Ta, Ti, Mo, Al, or alloy thereof.

Therefore, in the process of FIG. 2B, the metal layer for the gate electrode pattern 108 defined within the preset region for forming the TFT T, the pixel electrode pattern 110 defined within the preset region for forming the pixel electrode P, and the scan line 150 (see FIG. 1) are formed from multiple metal layers. The metal portion of the lower electrode 112 and the bonding pads 114, 114*a* is likewise formed from multiple metal layers.

The subsequent processes, that are, the processes in FIG. 2C-FIG. 2D are the same without further descriptions. In FIG. 2E, the second metal layer 122 over the substrate 100 is formed from multiple metal layers, such as two metal layers or three metal layers, and are composed of layers of Cr, W, Ta, Ti, Mo, Al, and alloy thereof. Here, materials of the second metal layer 122 can be identical or different to the previous first metal layer 104.

Therefore, in processes of FIG. 2F, the metal layer portion of the source electrode pattern 126, the drain electrode pattern 128, and the data line 160 can be formed from multiple metal layers. Likewise, the metal portion of the upper electrode 129 of the pixel storage capacitor can be formed from multiple metal layers.

For the subsequent processes, that are, the processes in FIG. 2G-FIG. 2H and FIG. 3A-FIG. 3B for the first embodiment, the processes in FIG. 4A-FIG. 4B for the second embodiment, the processes in FIG. 5A-FIG. 5B for the third embodiment are the same, and are not further described.

Pixel Structure

In the first embodiment, the pixel structure formed from four photomask processes includes a TFT T, a pixel electrode P, and a black matrix pattern 202*a*, as shown in FIG. 2H. Wherein, the TFT T is disposed on a surface of a substrate 100, and the TFT T includes a gate electrode pattern 108, a gate insulating layer 116*a* disposed on the gate electrode pattern 108, a semiconductor layer 118*a* over the gate insulating layer 116*a*, and a source electrode pattern/drain electrode pattern 126/128 over the semiconductor layer 118*a*. A pixel electrode pattern 110 of the pixel electrode P is disposed on a surface of the substrate 100, and the pixel electrode pattern 110 has electric contact with the TFT T. In addition, the black matrix pattern 202*a* covers over the TFT T and exposes the pixel electrode pattern 110.

In an embodiment, the drain electrode pattern 128 of the TFT T covers a portion of the pixel electrode pattern 110. In another embodiment, the gate electrode pattern 108 includes a lower transparent conductive layer 102*a* and an upper metal layer 104*a*. In an embodiment, the gate insulating layer 116*a* in the TFT T is just formed between the semiconductor layer 118*a* and the gate electrode pattern 108.

In the embodiment, the pixel structure further includes a storage capacitor C, disposed on the substrate 100. The storage capacitor C is formed from a lower electrode 112, an upper electrode 129, that is, the metal layer 122*a* above the lower electrode 112 and a dielectric layer between the two electrodes, such as the gate insulating layer with the semiconductor layer 118*a*. In an embodiment, the lower electrode 112 can be formed from a lower transparent conductive layer 102*a* and an upper metal layer 104*a*. In an embodiment, the upper electrode 129 covers a portion of the pixel electrode pattern 110.

In an embodiment, the pixel structure of the invention further includes bonding pads B and B', disposed on two edges of the substrate 100. The bonding pad pattern 114 of the bonding pad B is electrically coupled with the scan line 150, and is formed from a lower transparent conductive layer 102*a* and an upper metal layer 104*a*. The upper metal layer 104*a* exposes a portion of the lower transparent conductive layer 102*a*. The bonding pad pattern 114*a* of the bonding pad B' is electrically coupled to the data line 160, and the structure is similar to that of the bonding pad B. The black matrix pattern 202*a* exposes the lower transparent conductive layer 102*a* of the bonding pad patterns 114, 114*a*, so as to allow an electric connection to the external circuit.

In the second embodiment, the pixel structure formed by four photomask processes is similar to the structure in FIG. 2H. The difference is that the bottom side of the black matrix pattern 202*a* is further formed with a protection layer 200*a*, as shown in FIG. 3B. The pattern of the protection layer 200a is similar to the black matrix pattern 202a.

In the second embodiment, another type of pixel structure is similar to that in FIG. 2H, and the difference is that the upper surface of the black matrix pattern 202a further includes a patterned protection layer 200a, as shown in FIG. 4B. The patterned protection layer 200a has the pattern similar to the black matrix pattern 202a.

In the third embodiment, the pixel structure formed by four photomask processes is similar to the structure in FIG. 2H. The difference is that the bottom side of the black matrix pattern 202a is further formed with a patterned protection layer 200a, and the upper surface of the black matrix pattern 202a is further formed with another patterned protection layer 204a, as shown in FIG. 5B. The patterned protection layer 200a and the patterned protection layer 204a has the similar patter to the black matrix pattern 202a.

LCD Panel

Figure 6:
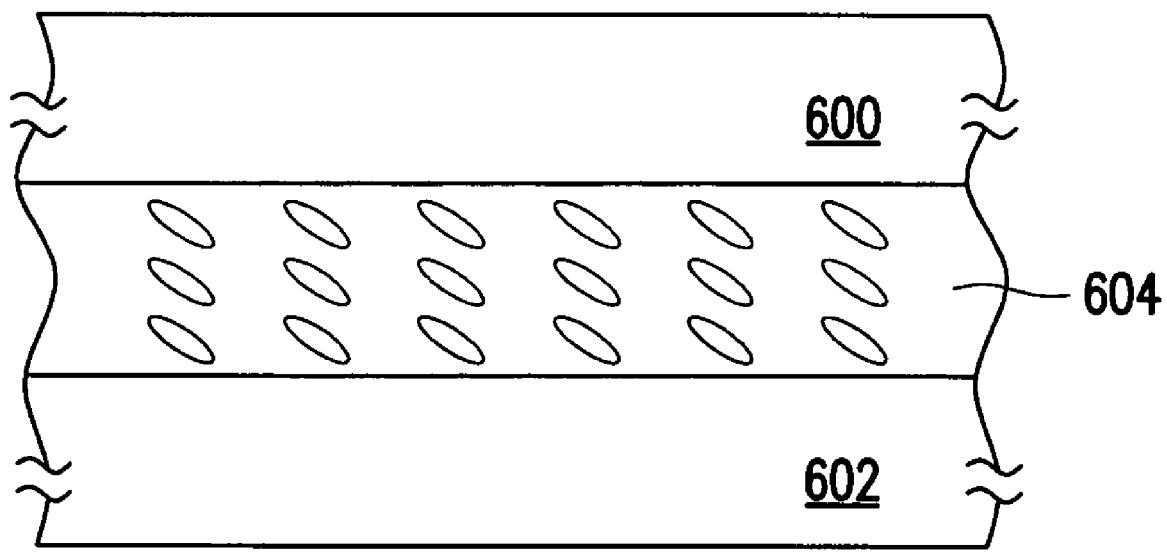
FIG. 6 is a cross-sectional view, schematically illustrating an LCD, according to a preferred embodiment of the invention.

The LCD panel is shown in FIG. 6, including a TFT-array substrate 602, a color-filter substrate 600, and a liquid crystal layer 604, wherein the foregoing TFT-array substrate 602 has several pixels, and each of the pixels of the TFT-array substrate 602 can have the structure in first embodiment as shown in FIG. 2H, or the structure in second embodiment as shown in FIG. 3B, or another structure in second embodiment as shown in FIG. 4B, or a structure in third embodiment as shown in FIG. 5B.

The color-filter substrate 600 includes three color filter patters in red, green, and blue. The space between the three color filter patterns in red, green, and blue can be a white mesh clearance or a black matrix. In the invention, since the TFT-array substrate 602 has been formed with the black matrix pattern, the color-filter substrate 600 can choose the one without formation of the black matrix. It is sure that the black matrix or other black matrix in different pattern can be chosen, such as the black matrix in edge frame.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A pixel structure of liquid crystal display, comprising:
    a thin film transistor (TFT), disposed over a surface of a substrate, wherein the TFT includes a gate electrode pattern, a gate insulating layer disposed on the gate electrode pattern, a semiconductor layer over the gate insulation layer, and a source electrode pattern with a drain electrode pattern formed over the semiconductor layer;
    a pixel electrode pattern, disposed over the surface of the substrate, wherein the drain electrode pattern of the TFT covers over a portion of the pixel electrode pattern and electrically contact with the pixel electrode pattern; and
    a black matrix pattern, covering over the TFT and directly lying on parts of the pixel electrode pattern, and exposing the pixel electrode pattern.

2. The pixel structure of claim 1, further comprising a patterned protection layer, covering over the black matrix pattern, and the patterned protection layer has a pattern the same as the black matrix pattern.

3. The pixel structure of claim 1, wherein the gate electrode pattern includes a lower transparent conductive layer and an upper metal layer.

4. The pixel structure of claim 3, wherein the upper metal layer is a single metal layer, an alloy layer, or a metal multi-layer.

5. The pixel structure of claim 1, further comprising a storage capacitor disposed over the substrate, wherein the storage capacitor includes a lower electrode, an upper electrode, and a dielectric layer, the lower electrode includes a lower transparent conductive layer and an upper metal layer, and the upper electrode covers a portion of the pixel electrode pattern.

6. The pixel structure of claim 1, further comprising a bonding pad pattern, disposed at two edges of the substrate, wherein the bonding pad includes a lower transparent conductive layer and an upper metal layer, and the upper metal layer expose a portion of the lower transparent conductive layer.

7. The pixel structure of claim 1, wherein each of the source electrode pattern and the drain electrode pattern are a single metal layer, an alloy layer, or a metal multi-layer.

8. A liquid crystal display (LCD) panel, comprising:
    a thin film transistor (TFT)-array substrate, a color-filter substrate, and a liquid crystal layer, wherein the TFT-array substrate has a plurality of pixels, and each of the pixels comprises:
        a TFT, comprising a gate electrode pattern, a gate insulating layer disposed on the gate electrode pattern, a semiconductor layer covering over the gate insulating layer, and a source electrode pattern with a drain electrode pattern fanned on the semiconductor layer;
        a pixel electrode pattern, disposed over the ITT-array substrate, and the drain electrode pattern of the TFT covers over a portion of the pixel electrode pattern and electrically contact with the pixel electrode pattern; and
        a black matrix pattern, covering the ITT and directly lying on parts of the pixel electrode pattern, and exposing the pixel electrode pattern.

9. The LCD panel of claim 8, further comprising a patterned protection layer, covering over the black matrix pattern, and the patterned protection layer has a pattern the same as the black matrix pattern.

* * * * *